(12) United States Patent
Cousin et al.

(10) Patent No.: US 11,293,376 B2
(45) Date of Patent: Apr. 5, 2022

(54) JET ENGINE NACELLE COMPRISING A MOBILE ASSEMBLY AND A REINFORCED FIXED STRUCTURE

(71) Applicant: Airbus Operations SAS, Toulouse (FR)

(72) Inventors: Antoine Cousin, L'Union (FR);
Laurent Caliman, Toulouse (FR);
Jérôme Gaillardo, Cugnaux (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 285 days.

(21) Appl. No.: 16/745,627

(22) Filed: Jan. 17, 2020

(65) Prior Publication Data

US 2020/0231296 A1 Jul. 23, 2020

(30) Foreign Application Priority Data

Jan. 22, 2019 (FR) ...................................... 1900534

(51) Int. Cl.
*F02K 1/72* (2006.01)
*F02K 1/76* (2006.01)
*B64D 27/18* (2006.01)
*B64D 29/06* (2006.01)

(52) U.S. Cl.
CPC ................ *F02K 1/72* (2013.01); *F02K 1/763* (2013.01); *B64D 27/18* (2013.01); *B64D 29/06* (2013.01)

(58) Field of Classification Search
CPC ..... F02K 1/64; F02K 1/70; F02K 1/72; F02K 1/76; F02K 1/763; F02K 1/766
See application file for complete search history.

(56) References Cited

U.S. PATENT DOCUMENTS 3,262,270 A 7/1966 Beavers
3,500,646 A 3/1970 Hom et al.
(Continued)

FOREIGN PATENT DOCUMENTS

ES 2391342 A1 11/2012
FR 3064308 A1 9/2018
(Continued)

OTHER PUBLICATIONS

French Search Report; priority document.

*Primary Examiner* — William H Rodriguez
(74) *Attorney, Agent, or Firm* — Greer, Burns & Crain, Ltd.

(57) ABSTRACT

A nacelle comprising a fixed structure with a fixed cowl and a duct, a mobile assembly with a chassis forming a frame and a mobile cowl, the chassis being mobile, relative to the fixed structure, in translation between an advanced position and a retracted position to open an opening through the frame between the duct and the outside. The mobile assembly comprises at least one threaded rod parallel to the direction of displacement and fixed to the chassis through the frame. The fixed structure comprises an outer, an inner, and at least one intermediate box fixed to the inner box and to the outer box. For each threaded rod, the fixed structure comprises a motorized ball nut which meshes with the threaded rod, and an actuator which turns the ball nut and is fixed to at least one box from among the outer, the inner, or the intermediate box.

8 Claims, 6 Drawing Sheets

(56) References Cited

U.S. PATENT DOCUMENTS

| | | | |
|---|---|---|---|
| 4,005,822 A * | 2/1977 | Timms | F02K 1/72 |
| | | | 239/265.31 |
| 4,216,909 A * | 8/1980 | Carlin | B60T 7/12 |
| | | | 239/265.31 |
| 4,586,329 A * | 5/1986 | Carlin | F02K 1/76 |
| | | | 188/82.3 |
| 5,778,659 A | 7/1998 | Duesler et al. | |
| 6,167,694 B1 * | 1/2001 | Davies | F02K 1/763 |
| | | | 60/226.2 |
| 8,453,429 B2 | 6/2013 | Gabel | |
| 9,816,462 B2 | 11/2017 | Guerin et al. | |
| 2015/0308379 A1 | 10/2015 | James | |
| 2015/0354499 A1 | 12/2015 | Caruel et al. | |
| 2016/0169157 A1 | 6/2016 | Sawyers-Abbott et al. | |
| 2017/0167440 A1 | 6/2017 | Aten | |
| 2017/0321632 A1 | 11/2017 | Howarth et al. | |
| 2018/0274484 A1 | 9/2018 | Ridray et al. | |
| 2019/0211776 A1* | 7/2019 | Kopecek | F02K 1/72 |

FOREIGN PATENT DOCUMENTS

| | | | | |
|---|---|---|---|---|
| GB | 1421153 A * | 1/1976 | | F02K 1/72 |
| WO | 2015019007 A1 | 2/2015 | | |

* cited by examiner

JET ENGINE NACELLE COMPRISING A MOBILE ASSEMBLY AND A REINFORCED FIXED STRUCTURE

CROSS-REFERENCES TO RELATED APPLICATIONS

This application claims the benefit of the French patent application No. 1900534 filed on Jan. 22, 2019, the entire disclosures of which are incorporated herein by way of reference.

FIELD OF THE INVENTION

The present invention relates to a nacelle for a turbofan that comprises a mobile assembly and a reinforced fixed structure, to a turbofan comprising a motor and a nacelle of that kind, and to an aircraft comprising at least one such turbofan.

BACKGROUND OF THE INVENTION

An aircraft includes a fuselage, to each side of which is fixed a wing. Under each wing is suspended at least one turbofan. Each turbofan is fixed under the wing by means of a pylon that is fixed between the structure of the wing and the structure of the turbofan.

The turbofan comprises a motor and a nacelle that is fixed around the motor. The turbofan also comprises a fan which is mounted forward of the motor and the air driven by the fan is split into a primary flow which passes through the motor and a secondary flow which passes through a secondary duct delimited between the motor and the nacelle.

The nacelle comprises a fan casing which extends around the fan and which is fixed.

The nacelle also comprises an assembly which is mobile in translation and which bears reverser doors of a thrust reversal system which serves to redirect the secondary flow out from the nacelle and forwards.

The mobile assembly is arranged to the rear of the fan casing and it is able to move between an advanced position and a retracted position.

In the advanced position, the mobile assembly is close to the fan casing so as to form an aerodynamic outer surface of the nacelle and an outer surface in the wall of the secondary duct. In the retracted position, the mobile assembly is moved away from the fan casing so as to create an opening between the fan casing and the mobile assembly, the opening creating a passage between the secondary duct and the outside.

The mobile assembly comprises a chassis that is mounted so as to be able to slide on a fixed structure of the nacelle and outer cowls which form the outer surface of the nacelle and inner walls which form the outer surface of the secondary duct.

The mobile assembly also comprises actuators, such as rams, which are fixed between the chassis of the mobile assembly and the fixed structure and which are controlled so as to move the chassis in one direction or the other.

Each reverser door is able to move in rotation on the chassis of the mobile assembly, between a stowed position and a deployed position. In the stowed position, the reverser door is outside the secondary duct and does not obstruct the secondary flow, and in the deployed position, the reverser door is across the secondary duct and obstructs the secondary flow so as to redirect it towards the opening.

The forces generated by the actuators are relatively large, and it is necessary to provide heavy structures that can withstand such forces. This makes it necessary to develop a new, more lightweight architecture.

SUMMARY OF THE INVENTION

The present invention has an object of proposing a turbofan nacelle which comprises a mobile assembly and a reinforced, more lightweight fixed structure.

To that end, there is proposed a nacelle for a turbofan, the nacelle having a longitudinal axis and comprising:
- a fixed structure comprising a fixed cowl and in which there is arranged a duct in which there flows a secondary flow,
- a mobile assembly comprising a chassis forming a frame and a mobile cowl fixed to the rear of the chassis, the chassis being mobile, relative to the fixed structure, in translation parallel to a direction of displacement between an advanced position, in which the mobile cowl is positioned to the rear of the fixed cowl and extends it, and a retracted position, in which the mobile cowl is retracted relative to the fixed cowl so as to open an opening through the frame between the duct and the outside, where the mobile assembly comprises at least one threaded rod, each one being parallel to the direction of displacement and fixed to the chassis through the frame, where the fixed structure comprises an outer box, an inner box and at least one intermediate box, where the outer box takes the form of a box of revolution about the longitudinal axis, where the inner box takes the form of a box of revolution about the longitudinal axis and inside the outer box, and where each intermediate box extends generally radially relative to the longitudinal axis and is fixed to the inner box and to the outer box, and where, for each threaded rod, the fixed structure comprises a motorized nut comprising a ball nut which meshes with the threaded rod, and an actuator which turns the ball nut and which is fixed to at least one box from among the outer box, the inner box or an intermediate box.

An architecture of this kind that integrates torsion boxes on which are fixed the actuators of the mobile assembly makes it possible to react the forces generated by the actuators with external lines of the nacelle that are finer and therefore have better aerodynamic performance.

Advantageously, the nacelle comprises gratings that are secured to the chassis of the mobile assembly and are fixed across the frame. For each grating, the fixed structure has a slot in which the grating is arranged, and each slot is delimited between the outer box and the inner box.

Advantageously, each slot is delimited angularly by two successive intermediate boxes.

Advantageously, the outer box bears a bearing element that has an outer bearing face which is oriented towards the outside and against which the fixed cowl bears.

Advantageously, a strip of Teflon® (polytetrafluoroethylene) is fixed either to the outer bearing face, or to the inside of the fixed cowl.

Advantageously, the outer box bears a seal which, in the advanced position, is positioned between the mobile cowl and the outer box.

The invention also proposes a turbofan comprising a motor and a nacelle according to the preceding description, where the duct is delimited between the motor and the nacelle.

The invention also proposes an aircraft comprising a turbofan in accordance with the above variant.

BRIEF DESCRIPTION OF THE DRAWINGS

The above-mentioned features of the invention, along with others, will become more clearly apparent on reading the following description of one exemplary embodiment, the description being given with reference to the appended drawings, in which.

DETAILED DESCRIPTION OF THE PREFERRED EMBODIMENTS

Figure 1:
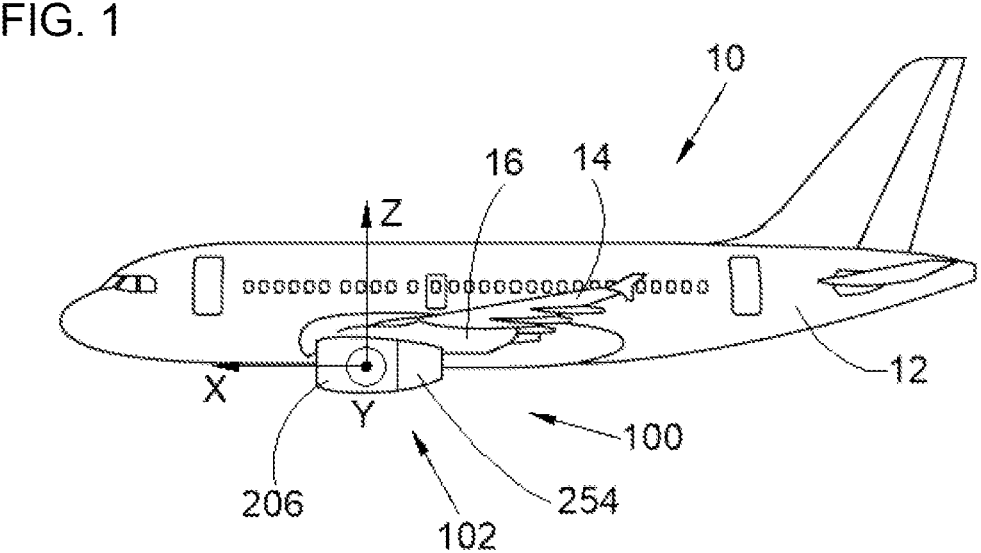
FIG. 1 is a side view of an aircraft comprising a nacelle according to the invention.

In the following description, terms relating to a position are provided in relation to an aircraft in a forward movement position as shown in FIG. 1.

FIG. 1 shows an aircraft 10 that comprises a fuselage 12, to each side of which is fixed a wing 14 that bears at least one turbofan 100 according to the invention. The turbofan 100 is fixed under the wing 14 by means of a pylon 16.

In the following description, and by convention: X denotes the longitudinal axis of the turbofan engine 100 that is parallel to the longitudinal axis of the aircraft 10, with positive orientation in the direction of advance of the aircraft 10; Y denotes the transverse axis of the turbofan 100, which is horizontal when the aircraft is on the ground; and Z denotes the vertical axis when the aircraft is on the ground; these three axes X, Y and Z being mutually orthogonal.

Figure 2:
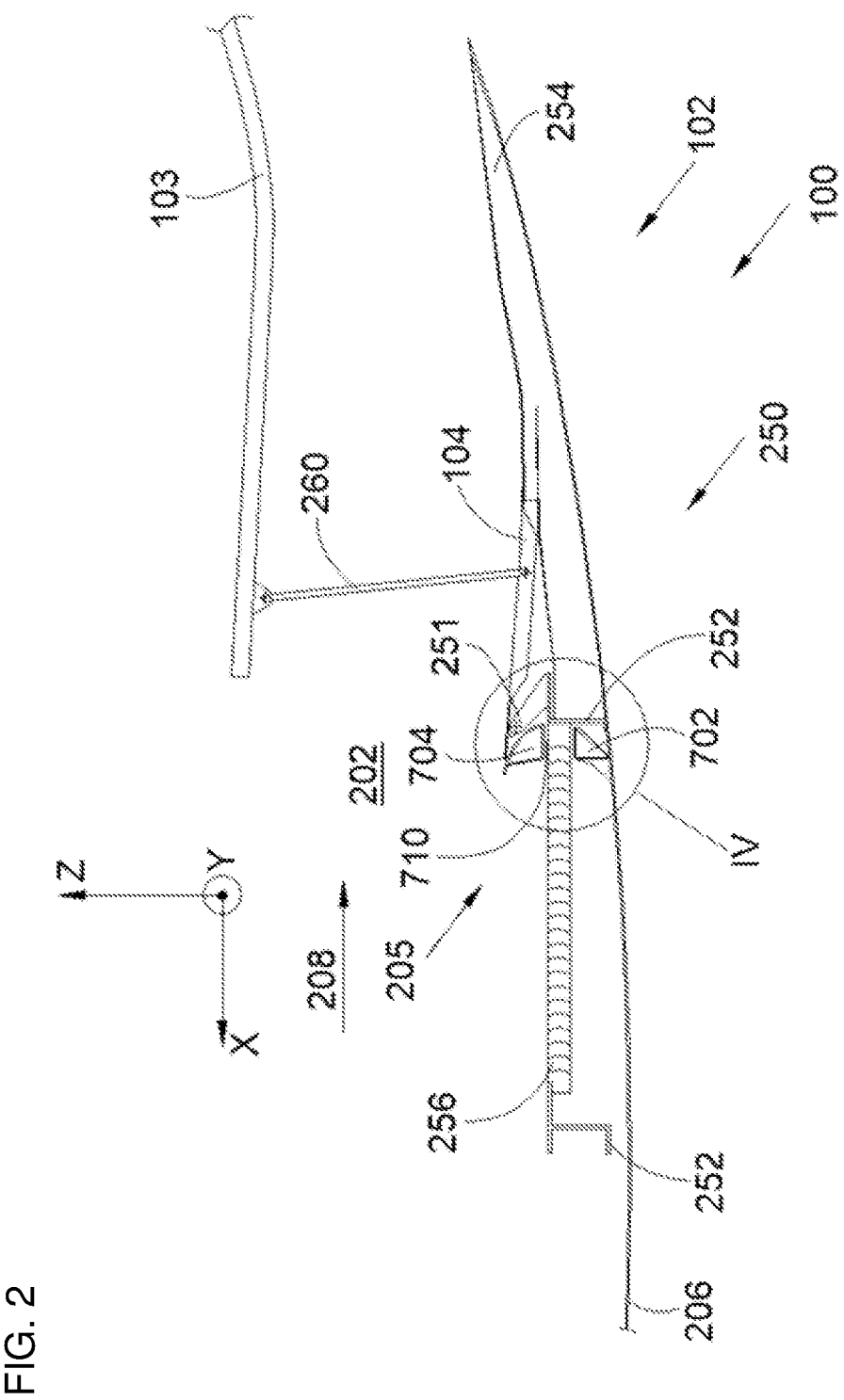
FIG. 2 is a view in section through a vertical plane of the nacelle in the advanced position and in the stowed position of the reverser door.
Figure 3:
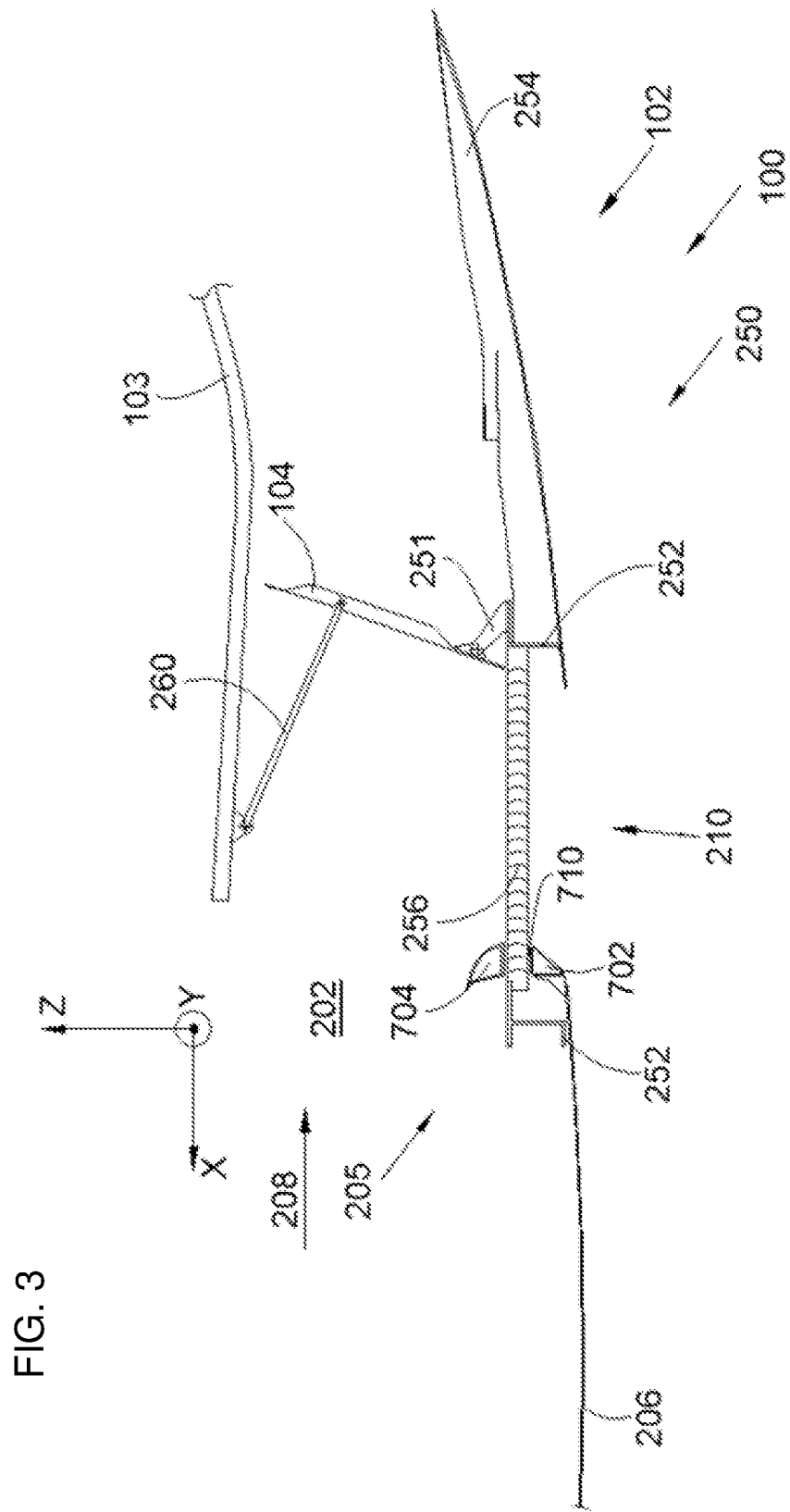
FIG. 3 is a view in section through a vertical plane of the nacelle in the retracted position and in the deployed position of the reverser door.

FIGS. 2 and 3 show the turbofan 100 which includes a nacelle 102 and a motor that is housed inside the nacelle 102. Here, the motor is represented by its outer wall 103. The longitudinal axis X of the turbofan 100 is also the longitudinal axis of the nacelle 102.

The nacelle 102 has a fixed structure 205 which comprises a fixed cowl 206.

In the fixed structure 205 there is arranged, between the fixed structure 205, and more generally the nacelle 102, and the motor, a duct 202 in which there flows a secondary flow 208.

The nacelle 102 comprises a mobile assembly 250 which is mobile in translation parallel to a direction of displacement that is generally parallel to the longitudinal axis X, with respect to the fixed structure 205 and to the fixed cowl 206, between an advanced position and a retracted position.

In the advanced position (FIG. 2), the mobile assembly 250 is close to the fixed cowl 206, and in the retracted position (FIG. 3), it is moved away from the fixed cowl 206 to the rear so as to open an opening 210 between the duct 202 and the outside.

The mobile assembly 250 comprises a chassis 252 which is mounted so as to be able to move in translation relative to the fixed structure 205 and a mobile cowl 254 fixed to the rear of the chassis 252. In the advanced position, the mobile cowl 254 is positioned to the rear of the fixed cowl 206 and extends it so as to form the aerodynamic outer surface of the nacelle 102. In the retracted position, the mobile cowl 254 is retracted relative to the fixed cowl 206 and the opening 210 is thus delimited through the frame at the front by the fixed structure 205 and at the rear by the mobile cowl 254.

In the embodiment of the invention presented here, the mobile assembly 250 comprises, through the frame, gratings 256 which are secured to the chassis 252 and which serve to redirect the flow passing through the opening 210, towards the front. To that end, the gratings 256 have redirecting fins. The gratings 256 are fixed across the frame. In the advanced position, the gratings 256 are housed in the fixed structure 205, and in the fixed position, they are positioned across the opening 210.

Figure 5:
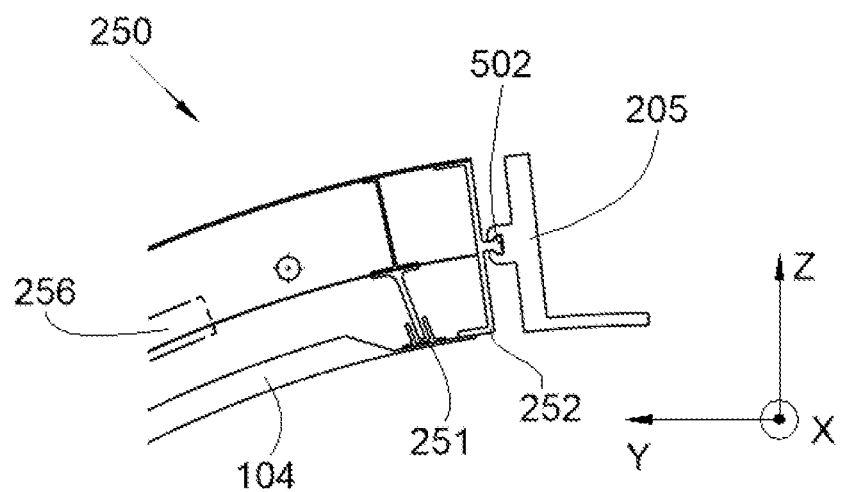
FIG. 5 is a front view of the nacelle.

FIG. 5 shows a front view of the mobile assembly 250.

The chassis 252 is guided in translation relative to the fixed structure 205 by any appropriate means such as slides 502 arranged at 12 o'clock and at 6 o'clock between the fixed structure 205 and the chassis 252, etc. FIG. 5 shows only the slide 502 arranged at 12 o'clock, but a similar slide can be installed at 6 o'clock.

In the embodiment of the invention shown here, the nacelle 102 comprises at least one reverser door 104. In particular, there can be two reverser doors 104 disposed one facing the other, or more than two reverser doors 104 regularly distributed over the periphery of the nacelle 102. Each reverser door 104 serves, depending on its position, to reverse the thrust of the turbofan engine 100.

In the following description, the invention is more particularly described for one reverser door 104, but the description applies in the same manner to each reverser door 104 when there is more than one of these.

The reverser door 104 has a rear edge which is mounted so as to be free to rotate on the mobile assembly 250, and more particularly on the chassis 252, via the intermediary of an articulation 251. The reverser door 104 is able to move between a stowed position and a deployed position for which the thrust reversal has maximum effectiveness. In the stowed position (FIG. 2), the reverser door 104 is positioned outside the duct 202, and more particularly in this case it is pressed to the inside of the mobile cowl 254, thus forming an outer surface of the duct 202. In the deployed position, the reverser door 104 opens inwards and the outer wall 103 is positioned across the duct 202 to so as to redirect at least part of the secondary flow 208 to the outside through the opening 210. The free end of the reverser door 104 is then closer to the outer wall 103.

The movement of the reverser door 104 from the stowed position to the deployed position is ensured by a drive system 260 which, in this case, is in the form of a linkage rod mounted in articulated fashion between the reverser door 104 and the outer wall 103. Thus, movement of the mobile assembly 250 will cause movement of the reverser door 104 which is retained by the linkage rod 260, which will cause the reverser door 104 to tip.

The drive system 260 described above may take other forms, such as a motor mounted at the axis of rotation of the reverser door 104.

Figure 6:
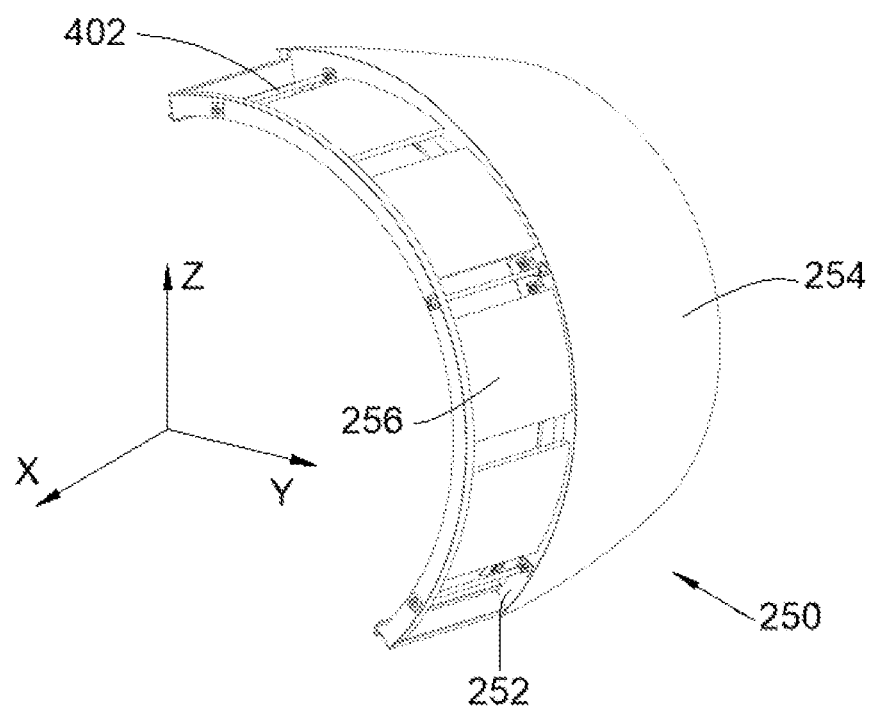
FIG. 6 is a perspective view of a mobile assembly of the nacelle according to the invention.

FIG. 6 shows a perspective view of a half-part of the mobile assembly 250. The mobile assembly 250 comprises at least one threaded rod 402. In the embodiment of the invention shown here, there are three threaded rods 402 and each one is arranged between two gratings 256, but the number may vary depending on the angular extent of the mobile assembly 250 which, in this case, comprises two half-parts each extending over approximately 180°, only one of these being shown, and each therefore comprising three threaded rods 402.

Each threaded rod 402 is parallel to the direction of displacement and is fixed to the chassis 252 across the frame. Here, each end of each threaded rod 402 is fixed to the chassis 252.

Figure 4:
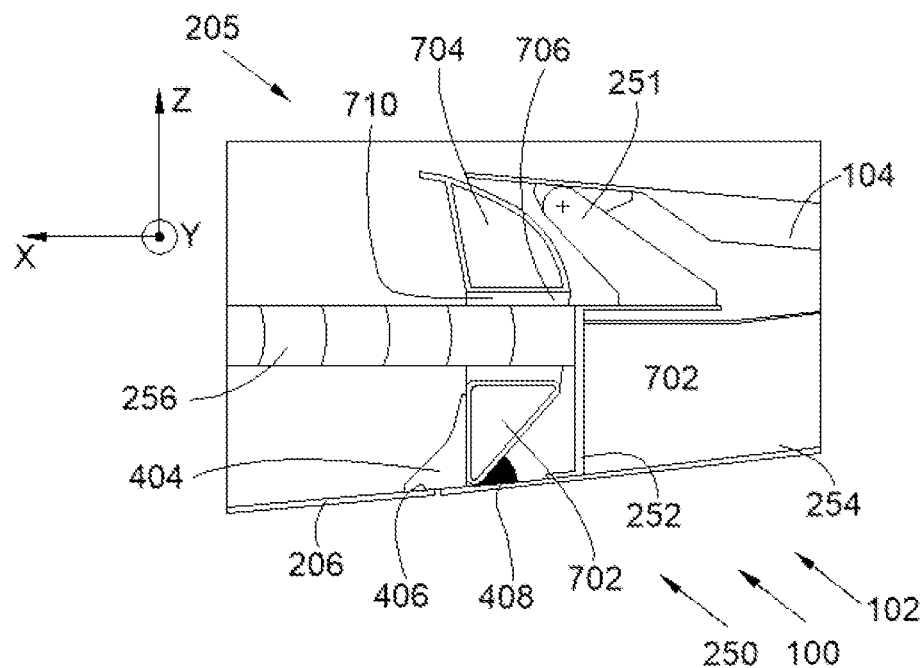
FIG. 4 is an enlarged view of detail IV of FIG. 2.
Figure 7:
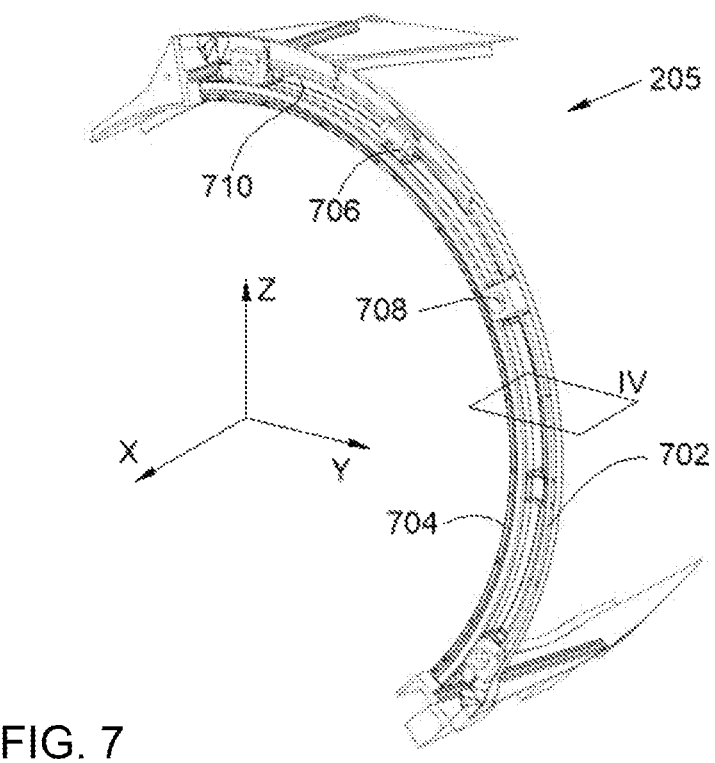
FIG. 7 is a perspective view of a fixed structure according to the invention.

FIG. 7 shows a view in perspective of a half-part of the fixed structure 205 which, in this case, as with the mobile assembly, comprises two half-parts each extending over approximately 180°, only one of these being shown. FIG. 4 shows an enlarged view of detail IV, which corresponds to a section through the plane IV of FIG. 7.

The following description is based on one half-part of the fixed structure 205, but it applies equally to the other half-part.

The fixed structure 205 comprises an outer box 702, an inner box 704 and at least one intermediate box 706.

Each box 702, 704, 706 is a torsion box (also referred to as a "torque box"), that is to say, a closed, hollow box. Owing to the angular extent of the two half-parts of the fixed structure 205 and of the mobile assembly 250, the outer box 702 and the inner box 704 take the form of two half-rings that are concentric about the longitudinal axis X.

The outer box 702 takes the form of a box of revolution about the longitudinal axis X and the inner box 704 takes the form of a box of revolution about the longitudinal axis X, inside the outer box 702. The outer box 702 extends over the outside of the fixed structure 205.

Each intermediate box 706 extends generally radially with respect to the longitudinal axis X and it is fixed to the inner box 704 and to the outer box 702, for example by welding or bolting or even each intermediate box 706 may be an integral part of an integrated composite part consisting of an inner box 704, an outer box 702 and intermediate boxes 706.

In this case, there are six intermediate boxes 706, at regular angular intervals.

A structure of this kind, based on torsion boxes, is particularly lightweight and rigid.

For each threaded rod 402, the fixed structure 205 comprises a motorized nut 708 which is fixed to at least one box from among the outer box 702, the inner box 704 or an intermediate box 706 and with which the threaded rod 402 meshes. Each motorized nut 708 is in this case arranged facing an intermediate box 706.

The motorized nut 708 comprises a ball nut which meshes with the threaded rod 402, and an actuator which turns the ball nut and which is fixed to at least one box from among the outer box 702, the inner box 704 or an intermediate box 706. In the embodiment of the invention shown here, the actuator is fixed to the outer box 702 and to the intermediate box 706. The forces passing through the actuator are thus reacted by the boxes 702, 704, 706 to which it is fixed.

The use of these boxes 702, 704 and 706 serves to reinforce the fixed structure 205 and to integrate the actuator therein, and thus makes it possible to reduce the thickness of the mobile cowl 254 and thus to have external lines of the nacelle 102 that are finer and therefore have better aerodynamic performance.

The fixed structure 205 has, between the outer box 702 and the inner box 704, a slot 710 in which there is arranged a grating 256. This slot 710 allows the grating 256 to move between the advanced position and the retracted position, and vice versa. Thus, for each grating 256, the fixed structure 205 has a slot 710 in which the grating 256 is arranged, and each slot 710 is delimited between the outer box 702 and the inner box 704.

In the embodiment of the invention presented here, each slot 710 is delimited angularly by two successive intermediate boxes 706.

As shown in FIG. 4, the outer box 702 bears a bearing element 404 that has an outer bearing face 406 which is oriented towards the outside and against which the fixed cowl 206 bears. The outer bearing face 406 is positioned inside the fixed cowl 206.

When the jet engine 100 is in operation, the fixed cowl 206 experiences deformations which move it relative to the outer bearing face 406. In order to limit friction during these movements, a strip of Teflon® is fixed between them, that is to say, on the outer bearing face 406 or the interior of the fixed cowl 206.

In order to improve the leak-tightness between the mobile cowl 254 and the outer box 702, the latter bears a seal 408 which, in the advanced position, is positioned between the mobile cowl 254 and the outer box 702.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle for a turbofan, said nacelle having a longitudinal axis and comprising:
   a fixed structure comprising a fixed cowl and in which there is arranged a duct in which there flows a secondary flow,
   a mobile assembly comprising a chassis forming a frame and a mobile cowl fixed to a rear of the chassis, the chassis being mobile, relative to the fixed structure, in translation parallel to a direction of displacement between an advanced position, in which the mobile cowl is positioned to a rear of the fixed cowl and extends the fixed cowl, and a retracted position, in which the mobile cowl is retracted relative to the fixed cowl so as to open an opening through the frame between the duct and an outside,
   wherein the mobile assembly comprises at least one threaded rod, each of the at least one threaded rods being parallel to the direction of displacement and fixed to the chassis through the frame,
   wherein the fixed structure comprises an outer box, an inner box and at least one intermediate box,
      wherein the outer box comprises a box of revolution about the longitudinal axis,
      wherein the inner box comprises a box of revolution about the longitudinal axis and inside the outer box, and
      wherein each intermediate box extends generally radially relative to the longitudinal axis and is fixed to the inner box and to the outer box, and
   wherein, for each of the at least one threaded rods, the fixed structure comprises a motorized nut comprising a ball nut which meshes with the at least one threaded rod, and an actuator which turns the ball nut and which is fixed to at least one box from among the outer box, the inner box or an intermediate box.

2. The nacelle according to claim 1, further comprising gratings that are secured to the chassis of the mobile assembly and are fixed across the frame, wherein, for each grating, the fixed structure has a slot in which said grating is arranged, and wherein each slot is delimited between the outer box and the inner box.

3. The nacelle according to claim 2, wherein each slot is delimited angularly by two successive intermediate boxes.

4. The nacelle according to claim 1, wherein the outer box bears a bearing element that has an outer bearing face which is oriented towards the outside and against which the fixed cowl bears.

5. The nacelle according to claim 4, wherein a strip of polytetrafluoroethylene is fixed either to the outer bearing face, or to an inside of the fixed cowl.

6. The nacelle according to claim 1, wherein the outer box bears a seal which, in the advanced position, is positioned between the mobile cowl and the outer box.

7. A turbofan including a motor and a nacelle according to claim 1, wherein the duct is delimited between the motor and the nacelle.

8. An aircraft comprising a turbofan according to claim 7.

* * * * *